(12) United States Patent
Kim et al.

(10) Patent No.: US 7,848,602 B2
(45) Date of Patent: Dec. 7, 2010

(54) WAVEGUIDE STRUCTURE AND ARRAYED WAVEGUIDE GRATING STRUCTURE

(75) Inventors: Duk-Jun Kim, Daejoen (KR); Jung-Ho Song, Daejeon (KR); Jong-Moo Lee, Daejeon (KR); Junghyung Pyo, Seoul (KR); Gyung-Ock Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/199,517

(22) Filed: Aug. 27, 2008

(65) Prior Publication Data

US 2009/0252457 A1 Oct. 8, 2009

(30) Foreign Application Priority Data

Apr. 4, 2008 (KR) ...................... 10-2008-0031847

(51) Int. Cl.
*G02B 6/10* (2006.01)
*G02B 6/26* (2006.01)
*G02B 6/34* (2006.01)
*G02B 6/42* (2006.01)

(52) U.S. Cl. ............................. 385/46; 385/15; 385/31; 385/32; 385/37; 385/39; 385/129

(58) Field of Classification Search .................. 385/15, 385/31, 32, 37, 39, 46, 129
See application file for complete search history.

(56) References Cited

U.S. PATENT DOCUMENTS 5,002,350 A 3/1991 Dragone

| | | | |
|---|---|---|---|
| 5,799,119 A | 8/1998 | Rolland et al. | |
| 6,028,973 A | 2/2000 | Schienle et al. | |
| 2003/0068152 A1* | 4/2003 | Gunn, III | 385/129 |
| 2003/0210865 A1* | 11/2003 | Johannessen | 385/49 |
| 2006/0222296 A1* | 10/2006 | Suzuki et al. | 385/39 |
| 2009/0116789 A1* | 5/2009 | Doerr | 385/37 |

FOREIGN PATENT DOCUMENTS

| JP | 11023868 A | 1/1999 |
|---|---|---|
| JP | 2001124944 A | 5/2001 |
| KR | 100299121 B1 | 6/2001 |

OTHER PUBLICATIONS

Y. Barbarin et al., "Expremely Small AWG Demultiplexer Fabricated on InP by Using a Double-Etch Process", IEEE Photonics Technology Letters, vol. 16, No. 11, Nov. 2004, pp. 2478-2480.
Wim Bogaerts et al., "Compact Wavelength-Selective Functions in Silicon-on-Insulator Photonic Wires", IEEE Journal of Selected Topics in Quantum Electronics, vol. 12, No. 6, Nov./Dec. 2006, pp. 1394-1401.

(Continued)

*Primary Examiner*—Charlie Peng
*Assistant Examiner*—Jerry Blevins

(57) ABSTRACT

Provided are a waveguide structure and an arrayed waveguide grating structure. The arrayed waveguide grating structure includes an input star coupler, an output star coupler, and a plurality of arrayed waveguides optically connecting the input star coupler and the output star coupler. Each of the arrayed waveguides includes at least one section having a high confinement factor and at least two sections having a relatively low confinement factor. The sections of the arrayed waveguides having a high confinement factor have the same structure.

13 Claims, 10 Drawing Sheets

OTHER PUBLICATIONS

Shoji Akiyama et al., "Air Trench Bends and Splitters for Dense Optical Integration in Low Index Contrast", Journal of Lightwave Technology, vol. 23, No. 7, Jul. 2005, pp. 2271-2277.

Meint K. Smit et al., "PHASAR-Based WDM-Devices: Principles, Design and Applications", IEEE Journal of Selected Topics in Quantum Electronics, vol. 2, No. 2, Jun. 1996, pp. 236-250.

* cited by examiner

WAVEGUIDE STRUCTURE AND ARRAYED WAVEGUIDE GRATING STRUCTURE

CROSS-REFERENCE TO RELATED APPLICATIONS

This U.S. non-provisional patent application claims priority under 35 U.S.C. §119 of Korean Patent Application No. 10-2008-0031847, filed on Apr. 4, 2008, the entire contents of which are hereby incorporated by reference.

BACKGROUND OF THE INVENTION

The present invention disclosed herein relates to a photonic device, and more particularly, to a waveguide structure and an arrayed waveguide grating structure.

The present invention has been derived from a research undertaken as a part of the information technology (IT) development business by Ministry of Information and Communication and Institute for Information Technology Advancement, Republic of Korea (Project Management No.: 2006-S-004-02, Project Title: silicon based high-speed optical interconnection IC).

Optical interconnections can be used for increasing bus speed of semiconductor devices such as a central processing unit (CPU). To exchange signals using optical interconnections, wavelength based optical signal separating technology is required. To this end, an arrayed waveguide grating (AWG) can be used as a wavelength division device. The AWG has many merits such as high-efficiency, good mass productivity, and low packaging costs. Particularly, the AWG and a semiconductor optical amplifier are necessary for realizing integrated optical devices such as a multiple wavelength laser or an integrated wavelength switch.

FIG. 1 is a plan view illustrating a typical AWG device.

Referring to FIG. 1, the AWG device includes an input star coupler 2, an arrayed waveguide structure, and an output star coupler 4 that are disposed between an input waveguide 1 and output waveguides 5. The arrayed waveguide structure includes array waveguides 3. The array waveguides 3 have different lengths and optically connect the input and output star couplers 2 and 4.

The input star coupler 2 distributes optical signals received from the input waveguide 1 to the array waveguides 3 of the arrayed waveguide structure. Here, the arrayed waveguide structure functions as a diffraction grating since the array waveguides 3 have different lengths such that optical signals output from the array waveguides 3 can be focused on different positions according to the wavelengths of the optical signals. The output waveguides 5 are connected to the different positions of the output star coupler 4 such that the optical signals can be separately transmitted to the output waveguides 5 according to their wavelengths. That is, the optical signals can be demultiplexed. On the other hand, if optical signals having proper wavelengths are input to the output waveguides 5, wavelength multiplexed optical signals are output from the input waveguide 1. That is, the AWG device can be used for wavelength multiplexing and demultiplexing. Detailed descriptions of the operational principle, design, and applications of the AWG device can be found in M. K. Smit et al, "PHASAR-Based WDM-Devices: Principles, Design and Applications," IEEE Journal of Selected Topics in Quantum Electronics, Vol. 2, No. 2, pp. 236-250, 1996.

The performance of the AWG device can be improved by reducing AWG loss and optical signal phase errors. The AWG loss can be defined as an optical signal intensity difference between the input waveguide 1 and the output waveguides 5. The AWG loss is dependent on geometric parameters such as waveguide interval or waveguide core layer thickness. Therefore, the AWG loss can be reduced by properly adjusting geometric parameters. For example, a method of reducing a coupling loss between a star coupler and an arrayed waveguides is disclosed in W. Bogaerts et al, "Compact Wavelength-Selective Functions in Silicon-on-Insulator Photonic Wires," IEEE Journal of Selected Topics in Quantum Electronics, Vol. 12, No. 6, pp. 1394-1401, 2006. However, the method proposed by W. Bogaerts et al has limitations in reducing phase errors of arrayed waveguides.

SUMMARY OF THE INVENTION

The present invention provides an arrayed waveguide grating (AWG) structure configured to reduce coupling loss between a star coupler and arrayed waveguides and phase error of the arrayed waveguides.

The present invention also provides an arrayed waveguide grating structure having a reduced size and configured to reduce phase error.

Embodiments of the present invention provide arrayed waveguide grating structures including sections having high and low confinement factors. The arrayed waveguide grating structures includes an input star coupler, an output star coupler, and a plurality of arrayed waveguides optically connecting the input star coupler and the output star coupler. Each of the arrayed waveguides includes at least one section having a high confinement factor and at least two sections having a relatively low confinement factor. The sections of the arrayed waveguides having a high confinement factor have the same structure.

In some embodiments, each of the arrayed waveguides may include at least two approximately linear sections, and at least one bending section having a radius of curvature smaller than the minimal radius of curvature of the approximately linear sections. In this case, the approximately linear section may have a low confinement factor, and the bending section may have a high confinement factor.

In other embodiments, the arrayed waveguides may have different lengths, wherein the approximately linear sections of the arrayed waveguides may have different lengths, and the bending sections of the arrayed waveguides may have substantially the same radius of curvature and length.

In still other embodiments, at least one of the approximately linear sections includes: at least one linear section having a low confinement factor; and a gently curved section having a radius of curvature greater than that of the bending section. In this case, the linear sections of the arrayed waveguides may have different lengths, and the gently curved sections of the arrayed waveguides may have substantially the same radius of curvature and different lengths.

In even other embodiments, the arrayed waveguides may include a core pattern and an auxiliary pattern disposed beside the core pattern. In this case, the auxiliary pattern may be thinner than the core pattern and may extend from the core pattern. For example, the auxiliary pattern may cover a lower portion of a sidewall of the core pattern at the sections having a low confinement factor and may be spaced apart from the core pattern at the section having a high confinement factor so as to expose the sidewall of the core pattern at the section having a high confinement factor. The auxiliary pattern may be formed of the same material as that used for forming the core pattern.

In yet other embodiments, the arrayed waveguides may include a highly refractive pattern and a low refractive pattern. In this case, the highly refractive pattern may be used as a core layer at the section having a high confinement factor, and the low refractive pattern may be used as the core layer at the sections having a low confinement factor. The sections having a low confinement factor may include a transition section to allow guided mode propagation between the highly refractive pattern and the low refractive pattern. The highly refractive pattern may have a tapered shape at the transition section, and the low refractive pattern may be used as a clad pattern at the transition section and the section having a high confinement factor so as to cover the highly refractive pattern.

In further embodiments, the arrayed waveguide grating structure may further include: at least one input waveguide facing the arrayed waveguides and optically connected to the input star coupler; and a plurality of output waveguides facing the arrayed waveguides and optically connected to the output star coupler.

In other embodiments of the present invention, waveguide structures include at least one waveguide pattern disposed on a lower clad. The waveguide pattern may include a core pattern and an auxiliary pattern thinner than the core pattern. The core pattern may include a bending section and an approximately linear section having a radius of curvature greater than that of the bending section. The auxiliary pattern may be spaced apart from the bending section of the core pattern so as to expose the lower clad and may cover at least a portion of a lower sidewall of the approximately linear section of the core pattern.

In still other embodiments of the present invention, waveguide structures include a highly refractive pattern and a low refractive pattern covering the highly refractive pattern. The highly refractive pattern may be locally disposed at a section of a light propagation path having a small radius of curvature so as to be used as a core layer of a waveguide, and the low refractive pattern may be used as a clad of the waveguide at a section of the light propagation path having a small radius of curvature and as the core layer of the waveguide at a section of the light propagation path having a large radius of curvature.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the specification, the dimensions of layers and regions are exaggerated for clarity of illustration. It will also be understood that when a layer (or film) is referred to as being 'on' another layer or substrate, it can be directly on the other layer or substrate, or intervening layers may also be present. Also, though terms like a first, a second, and a third are used to describe various regions and layers in various embodiments of the present invention, the regions and the layers are not limited to these terms. These terms are used only to tell one region or layer from another region or layer. Therefore, a layer referred to as a first layer in one embodiment can be referred to as a second layer in another embodiment. An embodiment described and exemplified herein includes a complementary embodiment thereof.

Figure 1:
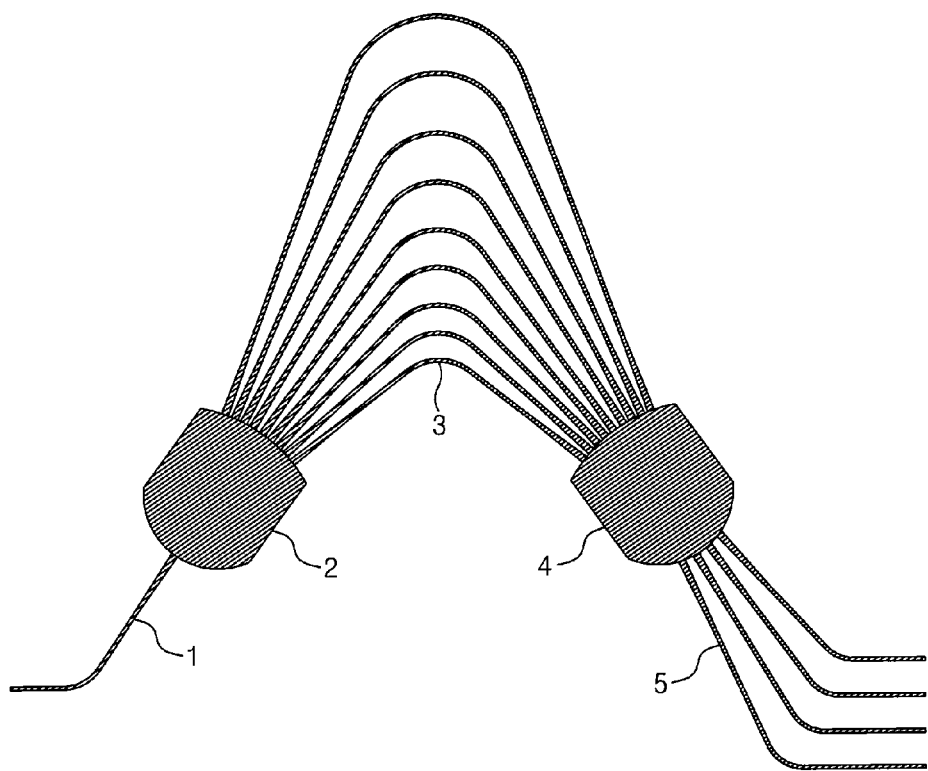
FIG. 1 is a plan view illustrating a typical arrayed waveguide grating (AWG) device.
Figure 2:
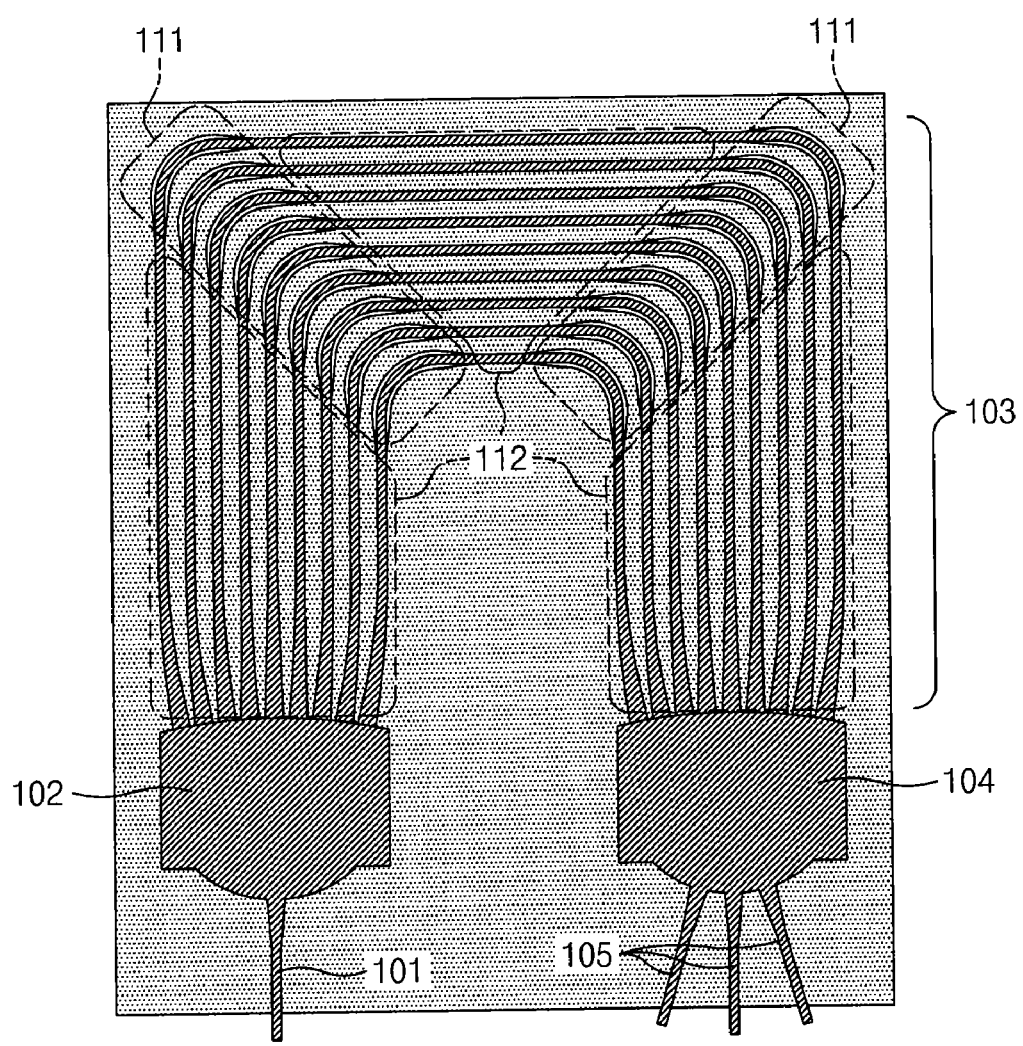
FIG. 2 is a plan view illustrating an AWG device according to an embodiment of the present invention.
Figure 3:
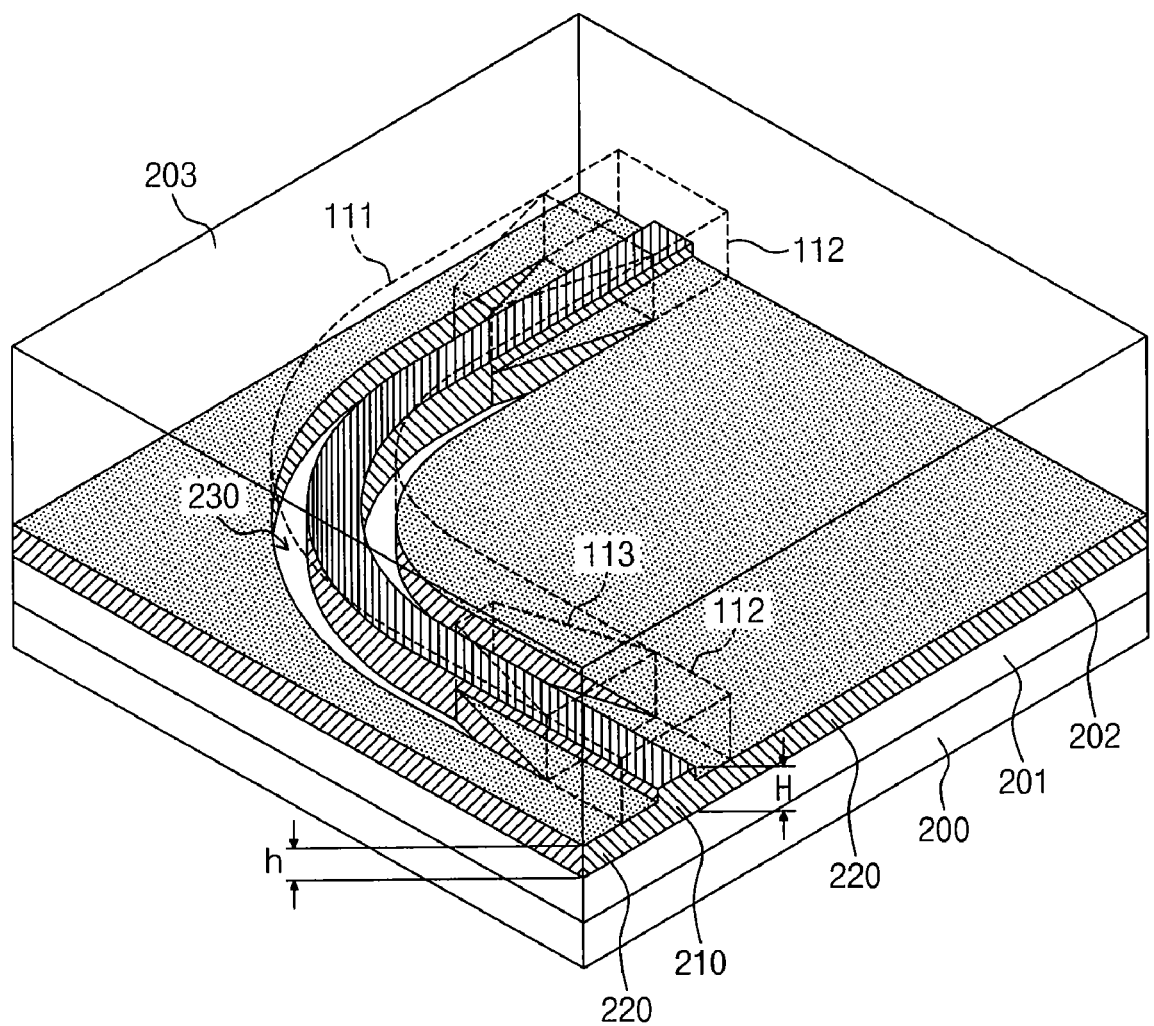
FIG. 3 is a perspective view illustrating a portion of the AWG device according to an embodiment of the present invention.

FIG. 2 is a plan view illustrating an AWG device according to an embodiment of the present invention, and FIG. 3 is a perspective view illustrating a portion of the AWG device according to an embodiment of the present invention.

Referring to FIGS. 2 and 3, the AWG device of the current embodiment includes a substrate 200, a lower clad 201, a core layer 202, and an upper clad 203. The core layer 202 is patterned to form at least one input waveguide 101, an input star coupler 102, a plurality of arrayed waveguides 103, an output star coupler 104, and a plurality of output waveguides 105.

In an embodiment, the substrate 200 may be a silicon substrate. The core layer 202 may be formed of silicon, silicon nitride, or InP. The lower clad 201 and the upper clad 203 may be formed of a material having a refractive index lower than that of the core layer 202. For example, the lower clad 201 and the upper clad 203 may be formed of a silicon oxide. It will be apparent to one of ordinary skill in the related art that the AWG device of the present invention can be formed using other materials instead of the above-mentioned material. That is, the present invention is not limited to the above-mentioned material. Well-known materials in the related art may be used for forming the AWG device.

Each of the arrayed waveguides 103 may include a first section having a high confinement factor and a second section having a relatively low confinement factor. (Here, the term "confinement factor" is a characteristic parameter representing a degree of local distribution of guided mode in the core of a waveguide.) Specifically, according to an embodiment of the present invention, each of the arrayed waveguides 103 may include at least two approximately linear sections 112 and at least one bending section 111 between the approximately linear sections 112. In an embodiment, the approximately linear sections 112 may be the second section having a low confinement factor, and the bending section 111 may be the first section having a high confinement factor. A method of realizing a difference in confinement factor, and technical effects of the confinement factor difference will be described later with reference to FIG. 4, and FIGS. 5A through 5D.

In the embodiment shown in FIG. 2, each of the arrayed waveguides 103 includes two bending sections 111. Here, corresponding bending sections 111 of the arrayed waveguides 103 may have the same structure. That is, corresponding bending sections 111 of the respective arrayed waveguides 103 may have the same length, thickness, width, curvature, and material. Alternatively, in another embodiment, as long as the phase of optical signals is not affected, at least one of the lengths, thicknesses, widths, curvatures, and materials of the corresponding bending sections 111 of the arrayed waveguides 103 may be different.

Similarly, the two bending sections 111 of one arrayed waveguides 103 may have the same structure. Alternatively, in another embodiment, the two bending sections 111 of one arrayed waveguides 103 may have different structures. Although the two bending sections 111 of one arrayed waveguides 103 have different structures, the corresponding bending sections 111 of the arrayed waveguides 103 may have the same structure.

Referring to the embodiment of FIG. 2, in each of the arrayed waveguides 103, three approximately linear sections 112 are connected in series with the two bending sections 111 such that the bending sections 111 can be optically connected to the input star coupler 102 and the output star coupler 104. Unlike the bending sections 111, the approximately linear sections 112 of the arrayed waveguides 103 have different lengths. Therefore, since the bending sections 111 of the arrayed waveguides 103 have substantially the same structure as described above, optical path lengths of the arrayed waveguides 103 are determined by the approximately linear sections 112 of the arrayed waveguides 103. That is, the optical path lengths of the arrayed waveguides 103 are different due to the approximately linear sections 112 such that optical signals output from the arrayed waveguides 103 are focused onto different positions according to the wavelengths of the optical signals. Thus, the arrayed waveguides 103 can function as a diffraction grating.

It will be apparent to one of skill in the related art that the numbers, structures, and arrangements of the bending sections 111 and the approximately linear sections 112 may be varied without departing from the spirit and scope of the present invention.

FIG. 3 is a view for explaining a method of varying confinement factors of the arrayed waveguides 103 according to an embodiment of the present invention. Referring to the embodiment shown in FIG. 3, the core layer 202 may include a core pattern 210 and an auxiliary pattern 220 thinner than the core pattern 210. The guided mode of an optical signal distributes mainly in the core pattern 210 and propagates along the core pattern 210. That is, the propagation path of the optical signal is substantially coincident with the core pattern 210.

The auxiliary pattern 220 may be formed of the same material as that used to form the core pattern 210. The auxiliary pattern 220 may extend from the core pattern 210 to cover portions of lower sidewalls of the core pattern 210. In detail, the auxiliary pattern 220 may cover portions of the sidewalls of the core pattern 210 corresponding to the approximately linear sections 112 but may be spaced apart from portions of the sidewalls of the core pattern 210 corresponding to the bending section 111. Therefore, openings 230 may be formed at the bending section 111 between the core pattern 210 and the auxiliary pattern 220 to expose the lower clad 201.

Accordingly, the sidewalls of the core pattern 210 are wholly in contact with the upper clad 203 at the bending section 111, and the sidewalls of the core pattern 210 are in contact with both the upper clad 203 and the auxiliary pattern 220 at the approximately linear sections 112. As explained above, the auxiliary pattern 220 and the upper clad 203 are formed of materials having different refractive indexes. Owing to the facts that the auxiliary pattern 220 and the upper clad 203 have different refractive indexes and the core pattern 210 makes contact with different materials, effective refractive index variation and phase error of the arrayed waveguides 103 can be reduced, which will be described with reference to FIG. 4.

Figure 4:
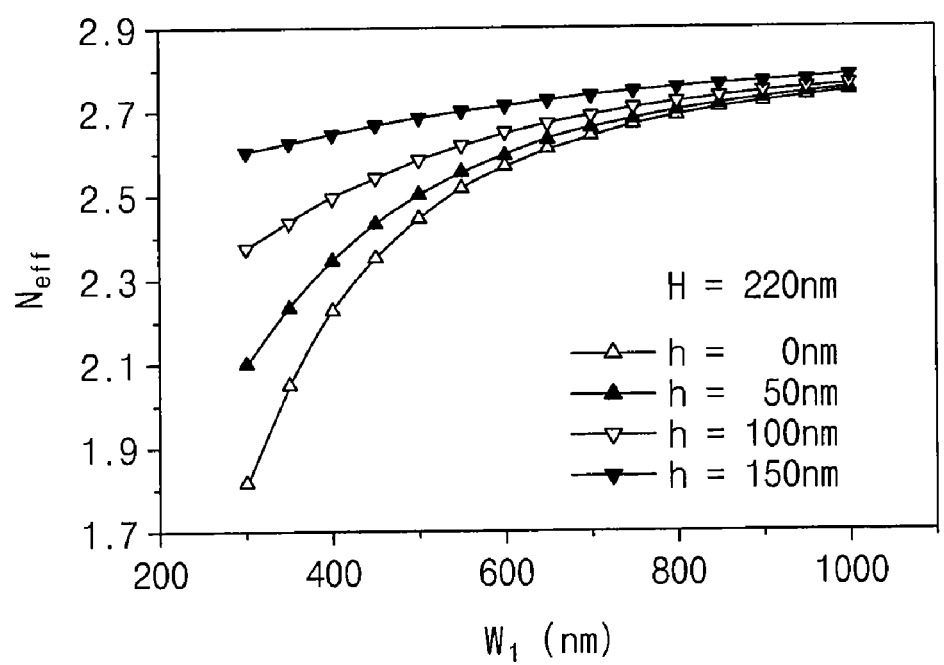
FIG. 4 is a simulation graph illustrating effective refractive index variation of a waveguide with respect to the width of a core pattern for several thickness differences between the core pattern and an auxiliary pattern.
Figure 5A:
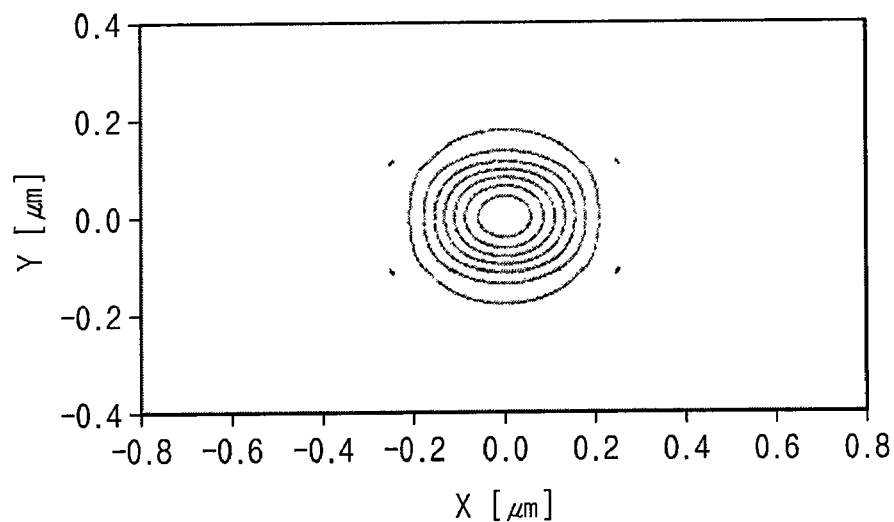
FIGS. 5A through 5D are simulation graphs showing distribution of guided mode of TE polarized signal light for different thicknesses of the auxiliary pattern.
Figure 5B:
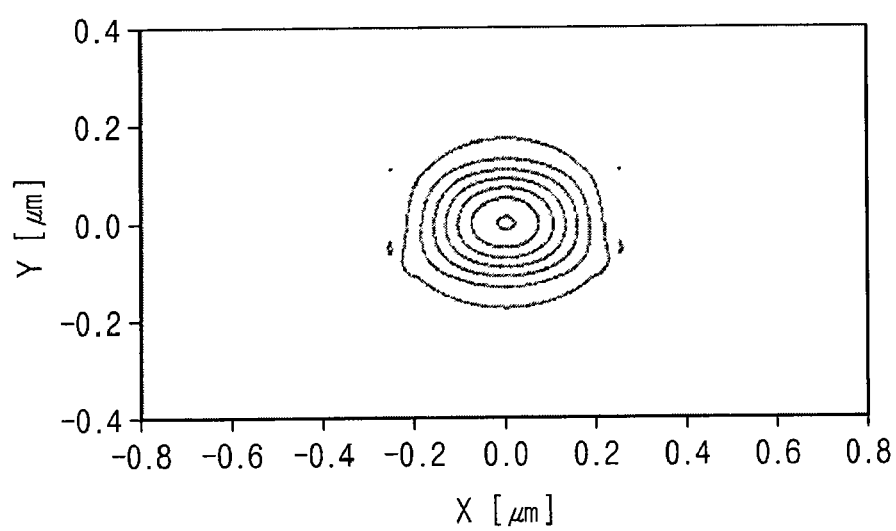
Figure 5C:
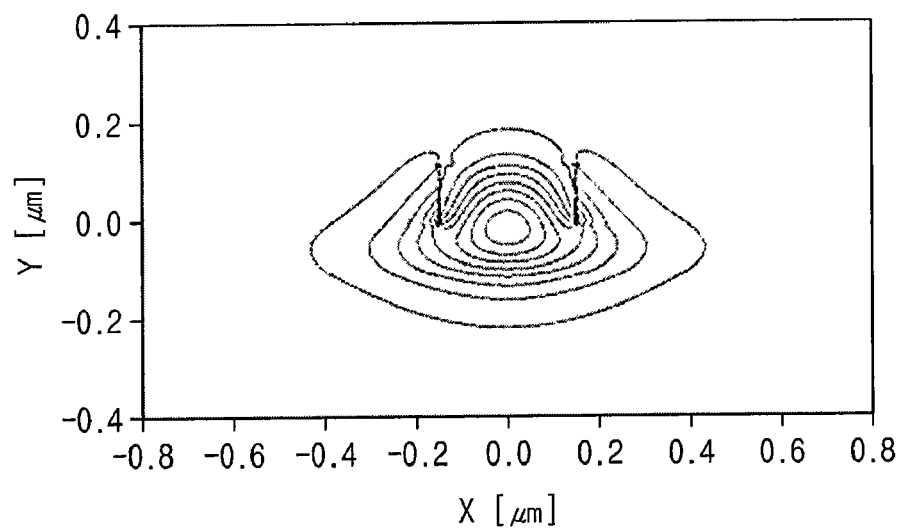
Figure 5D:
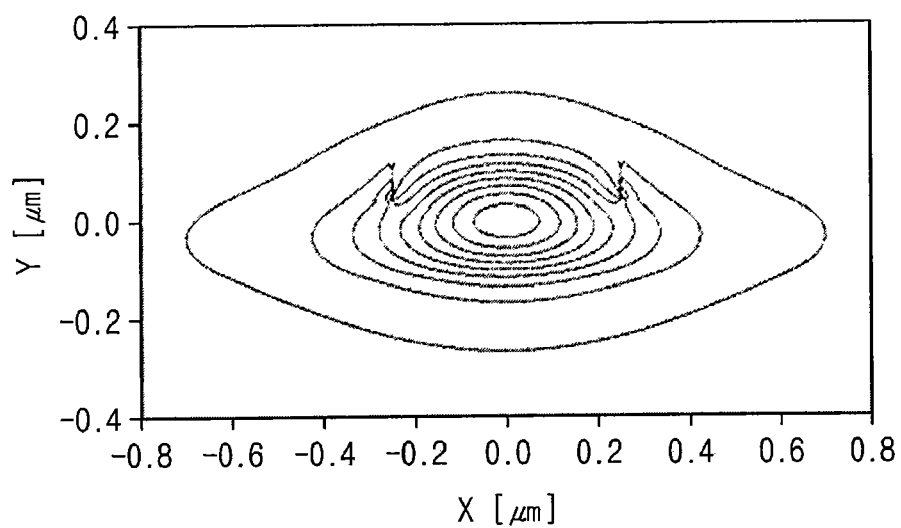

FIG. 4 is a simulation graph illustrating effective refractive index variation of the arrayed waveguides 103 with respect to the width of the core pattern 210 for several thickness differences between the core pattern 210 and the auxiliary pattern 220. In the simulation, the thickness (H) of the core pattern 210 was set to 220 nm, and transverse-electric (TE) polarized light was used as signal light. Then, the effective refractive index $N_{eff}$ of the arrayed waveguides 103 was calculated with respect to the width $W_1$ of the core pattern 210 while varying the thickness (h) of the auxiliary pattern 220.

Referring to FIG. 4, regardless of a thickness (h) of the auxiliary pattern 220, the derivative of the effective refractive index $N_{eff}$ with respect to the width $W_1$ of the core pattern 210, $dN_{eff}/dW_1$, increases as the width $W_1$ of the core pattern 210 decreases. Particularly, the derivative $(dN_{eff}/dW_1)$ is very large when the thickness (h) of the auxiliary pattern 220 is zero and the width $W_1$ of the core pattern 210 is about 500 nm. The derivative $(dN_{eff}/dW_1)$ decreases as the thickness (h) of the auxiliary pattern 220 increases.

Phase error of the arrayed waveguides 103 is sensitive to effective refractive index $\Delta N_{eff}$ of the arrayed waveguides 103, and crosstalk of the arrayed waveguides 103 are sensitive to the effective refractive index $\Delta N_{eff}$. Therefore, the arrayed waveguides 103 may be designed to have a low derivative $(dN_{eff}/dW_1)$ to decrease crosstalk and phase error of the AWG device.

Referring to the simulation results shown in FIG. 4, the above-described design requirement can be satisfied by reducing the difference between the thickness (h) of the auxiliary pattern 220 and the thickness (H) of the core pattern 210. Therefore, for example, the thickness (h) of a portion of the auxiliary pattern 220 adjacent to the core pattern 210 may be about 40% to about 85% of the thickness (H) of the core pattern 210. A portion of the auxiliary pattern 220 distant from the core pattern 210 may have substantially the same thickness as the core pattern 210. Thus, the thickness (h) of the auxiliary pattern 220 may range from about 40% to about 100% of the thickness (H) of the core pattern 210.

FIGS. 5A through 5D are simulation graphs showing distribution of guided mode of TE polarized signal light for different thicknesses (h) of the auxiliary pattern 220. In the simulation, the width and length of the core pattern 210 was set to 220 nm and 500 nm, respectively, and the thickness (h) of the auxiliary pattern 220 was set to 0 nm, 50 nm, 100 nm, and 150 nm for FIGS. 5A through 5D, respectively.

Referring to FIGS. 5A through 5D, the guided mode widens laterally (in the x-axis direction) as the thickness (h) of the auxiliary pattern 220 increases. That is, as the thickness (h) of the auxiliary pattern 220 increases, the confinement factor of the arrayed waveguide 103 decreases. The reason for this is that the guided mode of the signal light is not laterally confined in the core pattern 210 by the auxiliary pattern 220 since the auxiliary pattern 220 is formed of the same material as the core pattern 210. It can be understood that the center of the guided mode of the signal light is located in the core pattern 210 and the distribution pattern of the guided mode of the signal light in the core pattern 210 is determined by the thickness difference between the core pattern 210 and the auxiliary pattern 220.

As the confinement factor of the core pattern 210 decreases, the arrayed waveguides 103 can be optically coupled to the input and output star couplers 102 and 104 more efficiently. Therefore, it is necessary to decrease the confinement factor of portions of the arrayed waveguides 103 coupled to the input and output star couplers 102 and 104. This can be accomplished by increasing the thickness (h) of the auxiliary pattern 220 as shown in the FIGS. 5A through 5D. However, if the thickness (h) of the auxiliary pattern 220 is equal to the thickness (H) of the core pattern 210, it is difficult to guide the signal light. Therefore, portions of the auxiliary pattern 220 adjacent to the core pattern 210 may be thinner than the core pattern 210.

When the confinement factor of the core pattern 210 is low, optical loss may be large at a portion of the arrayed waveguide 103 having a small radius of curvature (e.g., the bending section 111). For example, since the guided mode of a signal light widens laterally in proportion to thickness (h) of the auxiliary pattern 220, the signal light may lose its energy at the bending section 111. Therefore, signal light loss can be reduced by increasing the radius of curvature of the arrayed waveguide 103. However, in this case, the size of the arrayed waveguide 103 may increase largely. Therefore, according to an embodiment of the present invention, the auxiliary pattern 220 is spaced apart from the core pattern 210 at the bending section 111 to cover the core pattern 210 with the upper clad 203 having a low refractive index for increasing the confinement factor of the core pattern 210 at the bending section 111. In this way, the arrayed waveguide 103 can have a high confinement factor at the bending section 111, and thus the bending section 111 is allowed to have a small radius of curvature since signal light loss can be minimized owing to the high confinement factor of the bending section 111.

Figure 6:
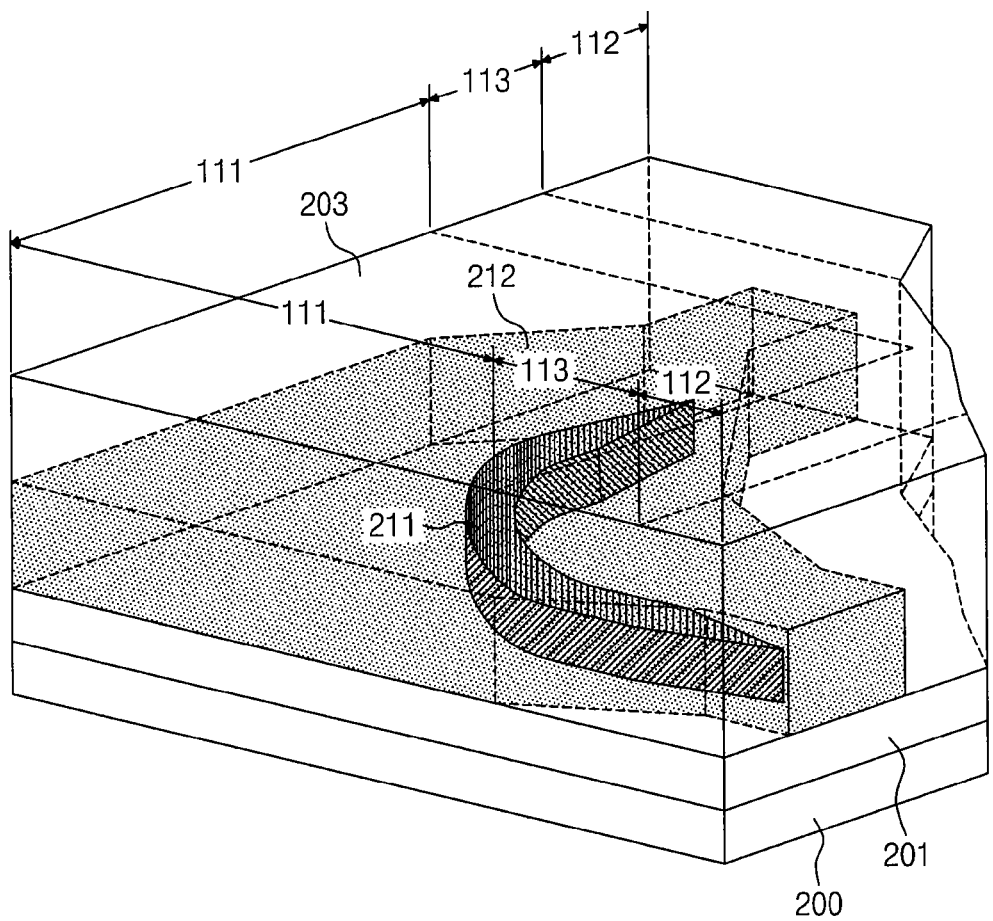
FIG. 6 is a perspective view illustrating a portion of an AWG device according to another embodiment of the present invention.

FIG. 6 is a perspective view illustrating a portion of an AWG device according to another embodiment of the present invention. In the current embodiment, a core pattern of an arrayed waveguide includes a bending section 111 and approximately linear sections 112. The bending section 111 and the approximately linear sections 112 are formed of different materials to realize a confinement factor difference along the arrayed waveguide. Except this, the arrayed waveguide of the current embodiment has the same structure as the arrayed waveguide 103 of the previous embodiments. Thus, a detailed description of the same structure will be omitted for conciseness.

Referring to FIG. 6, a core layer of the arrayed waveguide is formed of two materials having different refractive indexes. In detail, the arrayed waveguide includes a highly refractive pattern 211 and a low refractive pattern 212. The highly refractive pattern 211 is used as the core layer at the bending section 111. The low refractive pattern 212 has a refractive index lower than the highly refractive pattern 211 and is used as the core layer at the approximately linear sections 112. An upper clad 203 may cover top and side surfaces of the low refractive pattern 212, and the low refractive pattern 212 may cover top and side surfaces of the highly refractive pattern 211 at the bending section 111. That is, the upper clad 203 is used as a clad layer of the approximately linear sections 112, and the low refractive pattern 212 is used as a clad layer of the bending section 111.

The low refractive pattern 212 may be formed of a material having a refractive index higher than that of the upper clad 203. For example, the low refractive pattern 212 may be formed of a silicon nitride, and the upper clad 203 may be formed of a silicon oxide. In addition, a refractive index difference $\Delta n1$ between the low refractive pattern 212 and the highly refractive pattern 211 may be greater than a refractive index difference $\Delta n2$ between the upper clad 203 and the low refractive pattern 212 ($\Delta n1 > \Delta n2$).

These refractive index differences satisfy the spirit and scope of the present invention. In detail, since $\Delta n1 > \Delta n2$, the bending section 111 may have a confinement factor greater than that of the approximately linear sections 112. Therefore, the bending section 111 can have a small radius of curvature, and signal light loss at the bending section 111 can be minimized.

In the current embodiment, transition sections may formed in the approximately linear sections 112 (i.e., low refractive index sections) for guide mode propagation between the highly refractive pattern 211 and the low refractive pattern 212. In the transition sections, the highly refractive pattern 211 may become narrower toward the low refractive pattern 212. That is, both ends of the highly refractive pattern 211 may taper toward the low refractive pattern 212. Alternatively, other methods or structures may be used for guided mode propagation between the highly refractive pattern 211 and the low refractive pattern 212. That is, the present invention is not limited to the transition sections illustrated in FIG. 6.

Figure 7:
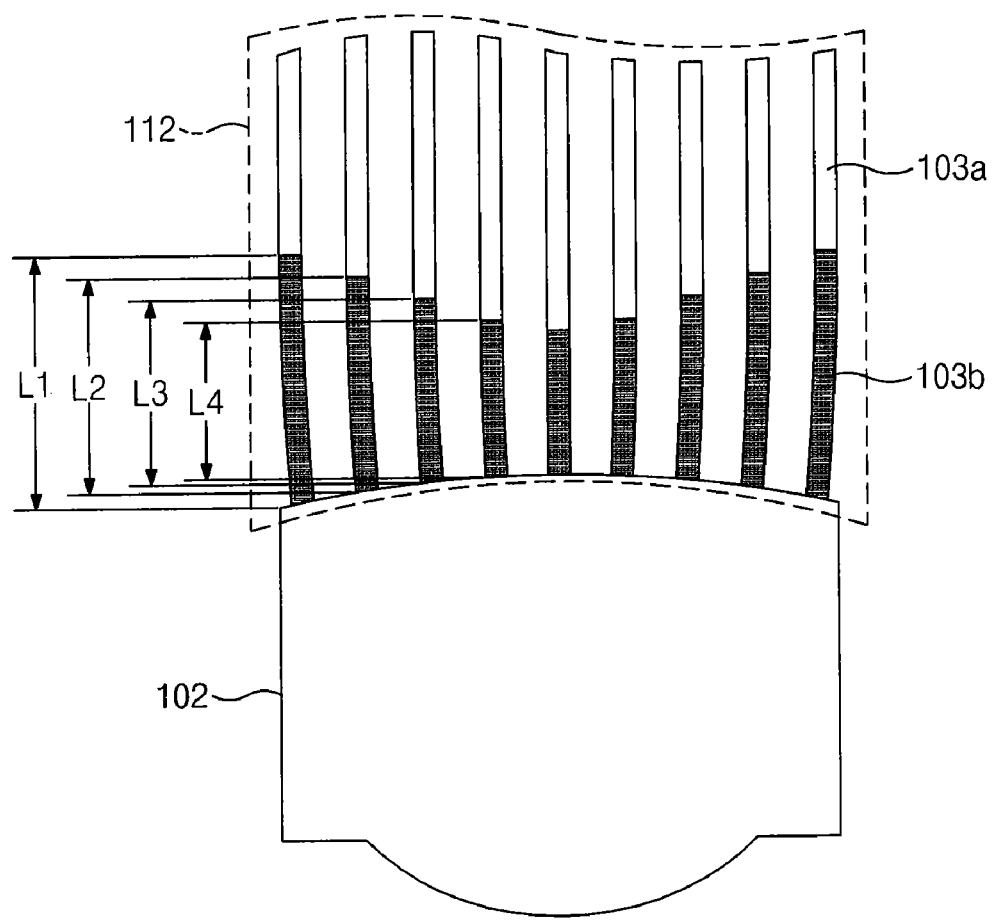
FIG. 7 is a plan view illustrating portions of approximately linear sections according to an embodiment of the present invention.

FIG. 7 is a plan view illustrating portions of approximately linear sections 112 of arrayed waveguides according to an embodiment of the present invention.

Referring to FIG. 7, each of the approximately linear sections 112 of the arrayed waveguides may include a linear section 103a and a gently curved section 103b. The radius of curvature of a core layer of the arrayed waveguide is infinite at the linear section 103a and greater than that of a bending section of the arrayed waveguide at the gently curved section 103b. In the current embodiment, the gently curved section 103b of the arrayed waveguides may have the same radius of curvature and different lengths according to positions of the guided waveguides (L1>L2>L3>L4).

It is known that it is difficult to calculate the phase of signal light according to the radius of curvature of a waveguide. Therefore, it is difficult to control the phase of signal light when the arrayed waveguides have different radius of curvatures. For this reason, the gently curved sections 103b of the arrayed waveguides may have the same radius of curvature. In this case, the phase of signal light may vary independent of the radius of curvature of the gently curved sections 103b, and thus the phase of signal light can be easily controlled by adjusting the lengths of the gently curved sections 103b.

Figure 8A:
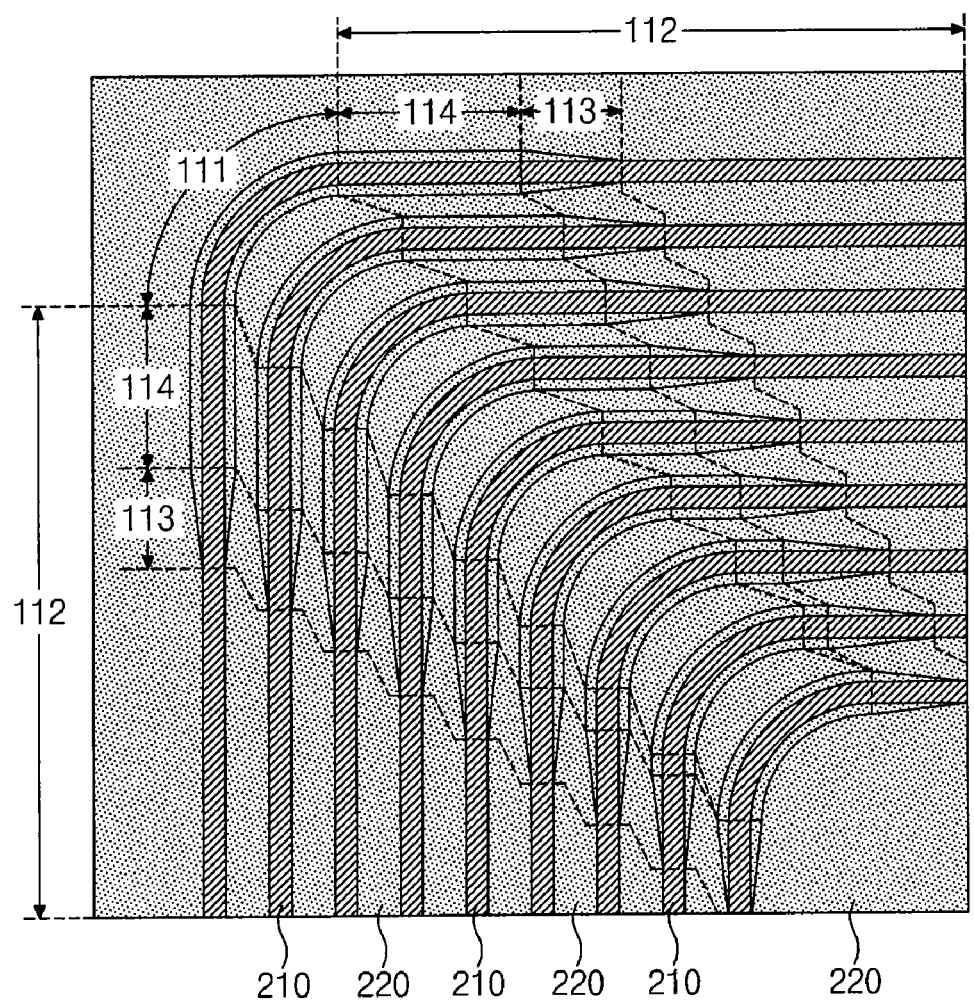
FIGS. 8A and 8B are plan views illustrating arrayed waveguides according to other embodiments of the present invention.
Figure 8B:
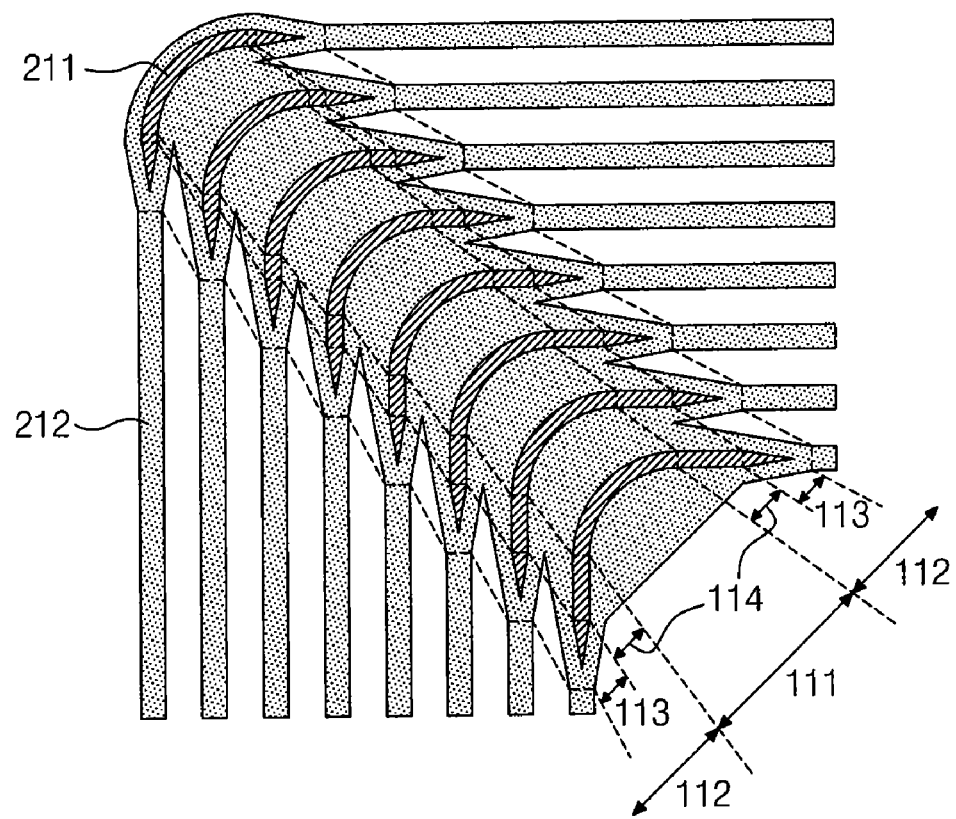

FIGS. 8A and 8B are plan views illustrating arrayed waveguides according to other embodiments of the present invention. The embodiments of FIGS. 8A and 8B are modified versions of the embodiments of FIGS. 3 and 6. Thus, the embodiments of FIGS. 8A and 8B are similar to the embodiments of FIGS. 3 and 6 except that approximately linear sections 112 include highly refractive sections 114. Therefore, descriptions of the same or similar elements will be omitted for conciseness.

Referring to FIGS. 8A and 8B, the approximately linear sections 112 may further include transition sections 113. The structure of the transition sections 113 can be varied based on known techniques.

At least one of the approximately linear sections 112 may include a highly refractive section 114. The phases of optical signals propagating through the arrayed waveguides can be precisely controlled using the highly refractive sections 114.

For this, the highly refractive sections 114 of the arrayed waveguides may have different structures (e.g., different lengths).

In the embodiments shown in FIGS. 8A and 8B, the highly refractive sections 114 may be disposed between the transition sections 113 and bending sections 111. Alternatively, the highly refractive sections 114 may be located at predetermined portions of the approximately linear sections 112. For example, the highly refractive sections 114 may be disposed between the transition sections 113 and input and output star couplers 102 and 104.

According to the present invention, sections of the arrayed waveguides having a large radius of curvature are configured to have a low confinement factor. Therefore, phase error caused by width variations of the arrayed waveguides can be reduced, and thus an arrayed waveguide grating structure having improved crosstalk characteristics can be provided.

Furthermore, sections of the arrayed waveguides having a small radius of curvature are configured to have a high confinement factor. Therefore, signal light can be guided with less optical loss, and the arrayed waveguide grating structure of the present invention can have a reduced size.

In addition, the sections of the arrayed waveguides having a small radius of curvature have the same structure. Therefore, according to the present invention, the phase difference of the arrayed waveguides can be effectively controlled independent of the radius of curvature of the arrayed waveguides.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An arrayed waveguide grating structure comprising:
an input star coupler;
an output star coupler; and
a plurality of arrayed waveguides optically connecting the input star coupler and the output star coupler,
wherein each of the arrayed waveguides comprises a core pattern through which an optical light travels,
wherein the core pattern comprises at least one first section having a first confinement factor and at least two second sections having a second confinement factor, the first confinement factor being higher than the second confinement factor,
wherein the confinement factor is a characteristic parameter representing a degree of local distribution of guided mode in the core pattern of the arrayed waveguide,
wherein the core pattern comprises at least two approximately linear sections, and at least one bending section having a radius of curvature smaller than the radius of curvature of the approximately linear sections,
wherein the bending section forms the first section and the approximately linear sections form the second sections, and
wherein at least one of the approximately linear sections of each arrayed waveguide comprises:
at least one linear section having a confinement factor lower than the first confinement factor; and
a gently curved section having a radius of curvature greater than that of the bending section,
wherein the linear section of each arrayed waveguide has different length from the linear sections of the remaining arrayed waveguides.

2. An arrayed waveguide grating structure comprising:
an input star coupler;
an output star coupler; and
a plurality of arrayed waveguides optically connecting the input star coupler and the output star coupler,
wherein each of the arrayed waveguides comprises a core pattern through which an optical light travels,
wherein the core pattern comprises at least one first section having a first confinement factor and at least two second sections having a second confinement factor, the first confinement factor being higher than the second confinement factor,
wherein the confinement factor is a characteristic parameter representing a degree of local distribution of guided mode in the core pattern of the arrayed waveguide,
wherein the arrayed waveguides comprise an auxiliary pattern disposed beside the core pattern,
wherein the core pattern defines a path for an optical signal,
wherein the auxiliary pattern is provided adjacent to the core pattern and extends from the core pattern,
wherein the auxiliary pattern is thinner than the core pattern so that an upper portion of the sidewall of the core pattern at the second section contacts an upper clad layer while the lower portion of the sidewall of the core pattern at the second section is covered by the auxiliary pattern, and
wherein an opening is defined between the auxiliary pattern and the core pattern at the first section so as to expose the sidewall of the core pattern at the first section so that the upper portion and the lower portion of the sidewall of the core pattern at the first section contact the upper clad layer.

3. The arrayed waveguide grating structure of claim 2, wherein the auxiliary pattern is formed of the same material as that used for forming the core pattern.

4. An arrayed waveguide grating structure comprising:
an input star coupler;
an output star coupler; and
a plurality of arrayed waveguides optically connecting the input star coupler and the output star coupler,
wherein each of the arrayed waveguides comprises a core pattern through which an optical light travels,
wherein the core pattern comprises at least one first section having a first confinement factor and at least two second sections having a second confinement factor, the first confinement factor being higher than the second confinement factor,
wherein the confinement factor is a characteristic parameter representing a degree of local distribution of guided mode in the core pattern of the arrayed waveguide, and
wherein the arrayed waveguides comprise a highly refractive pattern and a low refractive pattern, the highly refractive pattern being used as a core layer at the first section and the low refractive pattern being used as the core layer at the second sections.

5. The arrayed waveguide grating structure of claim 4, wherein the second sections comprise a transition section to allow guided mode propagation between the highly refractive pattern and the low refractive pattern, and
wherein the highly refractive pattern has a tapered shape at the transition section, and the low refractive pattern is used as a clad pattern covering the highly refractive pattern at the transition section and the first section.

6. The arrayed waveguide grating structure of claim 4, further comprising:
- at least one input waveguide optically connected to the input star coupler; and
- a plurality of output waveguides optically connected to the output star coupler.

7. A waveguide structure comprising at least one waveguide pattern disposed on a lower clad, the waveguide pattern comprising a core pattern defining a path for an optical signal, the core pattern having a bending section and an approximately linear section having a radius of curvature greater than that of the bending section;
- an auxiliary pattern provided adjacent to the core pattern and is thinner than the core pattern at the approximately linear section, the auxiliary pattern covering a lower sidewall of the approximately linear section of the core pattern at the approximately linear section; and
- an opening defined between the auxiliary pattern and the bending section of the core pattern at the bending section, the opening exposing a lower sidewall and an upper sidewall of the bending section of the core pattern.

8. The waveguide structure of claim 7, further comprising an input star coupler and an output star coupler,
- wherein the waveguide pattern connects the input star coupler and the output star coupler, and
- wherein the bending section of the waveguide patterns has substantially the same radius of curvature and length as those of the remaining waveguide patterns.

9. The waveguide structure of claim 7, wherein the auxiliary pattern is formed of the same material as that used for forming the core pattern, and the auxiliary pattern has a thickness in a range from about 40% to about 85% of a thickness of the core pattern.

10. The waveguide structure of claim 7, further comprising an upper clad covering the waveguide pattern, wherein the upper clad is formed of a material having a refractive index lower than that of the waveguide pattern.

11. A waveguide structure comprising a first refractive pattern and a second refractive pattern in a light propagation path,
- wherein the first refractive pattern has a refraction index higher than that of the second refractive pattern,
- wherein the first refractive pattern is disposed at a first section of a light propagation path having a small radius of curvature so as to be used as a core layer of a waveguide, and
- wherein the second refractive pattern is disposed at a first section and serves as a clad of the first refractive pattern, and disposed at a second section having a radius of curvature larger than that of the first section and servers as a core layer.

12. The waveguide structure of claim 11, further comprising an upper clad configured to cover the low refractive pattern,
- wherein a refractive index difference between the highly refractive pattern and the low refractive pattern is greater than a refractive index difference between the upper clad and the low refractive pattern.

13. The waveguide structure of claim 11, wherein the highly refractive pattern and the low refractive pattern are used as arrayed waveguide patterns for optically connecting an input star coupler and an output star coupler.

* * * * *